United States Patent [19]

Asada et al.

[11] Patent Number: 5,112,141
[45] Date of Patent: May 12, 1992

[54] DISK DRIVING APPARATUS

[75] Inventors: Takafumi Asada, Hirakata; Masato Morimoto; Takashi Sonoda, both of Neyagawa, all of Japan

[73] Assignee: Matsushita Electric Industrial Co., Ltd., Osaka, Japan

[21] Appl. No.: 543,585

[22] Filed: Jun. 26, 1990

[30] Foreign Application Priority Data

Jun. 30, 1989 [JP] Japan ............... 1-170150

[51] Int. Cl.⁵ .................. F16C 17/10; F16C 32/06
[52] U.S. Cl. .................... 384/100; 384/107; 384/122
[58] Field of Search ............. 384/100, 107, 112, 113, 384/121, 122, 123, 240, 243, 368, 420

[56] References Cited

U.S. PATENT DOCUMENTS

| | | |
|---|---|---|
| 4,200,344 | 4/1980 | Binns et al. |
| 4,557,610 | 12/1985 | Asada et al. ............ 384/107 |
| 4,573,807 | 3/1986 | Asada et al. ............ 384/100 |
| 4,696,584 | 9/1987 | Tielemans ............ 384/107 |

FOREIGN PATENT DOCUMENTS

| | | | |
|---|---|---|---|
| 50318 | 3/1983 | Japan | 384/123 |
| 18615 | 1/1985 | Japan | 384/100 |
| 140611 | 6/1986 | Japan | 384/420 |

Primary Examiner—Thomas R. Hannon
Attorney, Agent, or Firm—Wenderoth, Lind & Ponack

[57] ABSTRACT

A disk driving apparatus has, a chassis, a fixed shaft having one end attached to the chassis, a hub rotatably mounted around an outer circumferential surface of the fixed shaft and at least one disk mounted on an outer circumferential surface of the hub, the other end of the fixed shaft having a stopper thereon for engaging the hub for retaining the hub on the fixed shaft, a disk fixing plate positioned over the other end of the fixed shaft and fixing the one disk to the hub and having a surface opposed to the other end of the fixed shaft, a thrust bearing element movably mounted between the disk fixing plate surface and one of the other end of the fixed shaft and the stopper, and a hydrodynamic pressure generating groove formed in one of a herringbone pattern and a helical pattern and being on one of an outer circumferential surface of the fixed shaft and an inner circumferential surface of the hub.

4 Claims, 4 Drawing Sheets

5,112,141

DISK DRIVING APPARATUS

BACKGROUND OF THE INVENTION

The present invention relates to a disk driving apparatus for rotating a disk such as a hard disk or an optical disk.

Recently, in such a disk driving apparatus, it is necessary for a bearing which is the heart thereof to have high accuracy and reduced torque, requiring a small gas bearing with lower friction.

One example of a known gas bearing is shown in FIG. 6. In FIG. 6, reference numeral 1 denotes a chassis having a housing 2 mounted thereon. The housing 2 is provided with a shaft 4 rotatably accommodated therein and having a hub 4B. The shaft 4 has an end section 4C at the lower end and a disk flange 4A perpendicular to the shaft 4. A bottom plate 3 is attached to the housing 2 so as to be at a right angle with shaft 4. At a contact surface of the bottom plate 3 and the end section 4C, a hydrodynamic pressure generating groove 3A is formed to cause pressure between the end section 4C thereof and the groove 3A so as to rise the shaft 4 with respect to the housing 2 out of contact with bottom plate 3 during rotation because of pressure generated between the bottom plate 3 and the end section 4C. On either the outer circumferential surface of the shaft 4 or the inner circumferential surface of the housing 2, hydrodynamic pressure generating grooves 5A and 5B are formed in herringbone patterns to carry out the noncontacting rotation. A motor rotor 6 is mounted on the shaft 4 having the hub 4B at the upper end thereof and a motor stator 7 is attached inside the housing 2 confronting the rotor 6. Disks 8 and spacers 9 are alternately attached to the hub 4B and fixed by a disk fixing plate 10.

The operation of the hydrodynamic gas bearing device with the above-described construction will be described hereinbelow. Firstly, when the stator 7 is energized, the rotor 6 rises by the pressure of gas in the hydrodynamic pressure generating grooves 5A and 3A and rotates together with the shaft 4, the disks 8, the spacers 9, and the disk fixing plate 10.

However, the device with such a construction has the following problems. That is, the device has large number of parts; very high assembly accuracy between the shaft end section comprised of the hydrodynamic thrust bearing and the bottom plate 3 is required; poor assembly accuracy causes the thrust bearing to come in contact with something to prevent the shaft from rising.

SUMMARY OF THE INVENTION

Accordingly, an essential object of the present invention is to remedy the problems and to provide a disk driving apparatus to reduce the number of parts, and not to require very high assembly accuracy.

In accomplishing these and other objects, according to one aspect of the present invention, there is provided a disk driving apparatus comprising: a fixed shaft having one end attached to a chassis; a hub rotatably attached to an outer circumferential surface of the fixed shaft and having a disk at an outer circumferential surface of the hub; a stopper for engaging in a recess of the hub and fixed to the end of the fixed shaft; a disk fixing plate fixed to the end of the fixed shaft over the stopper and fixing the disk attached to the hub; a thrust bearing movably constructed between a surface of the disk fixing plate and one of an end surface of the fixed shaft and an end surface of the stopper; and a hydrodynamic pressure generating groove formed in one of a herringbone pattern and a helical pattern at one of an outer circumferential surface of said fixed shaft and an inner circumferential surface of said hub.

By the above construction of the present invention, the disk fixing plate serves both for fixing the disks and serving as the thrust bearing, resulting in reducing the number of parts of the gas bearing device. The thrust bearing is movably arranged in the gas bearing device, with the result that it is unnecessary for the fixed shaft to be at a right angle and it is easy to manufacture the fixed shaft. The fixed shaft has sufficient diameter to be easily fixed to the chassis. Preferably, the disk fixing plate has an air intake and a filter, with the result that after gas is cleaned through the filter, the gas is supplied from the air intake into the inside of the gas bearing device. Thus, seizing of the gas bearing device because of dust getting into a gap of the bearing can be prevented.

DESCRIPTION OF THE DRAWINGS

These and other objects and features of the present invention will become clear from the following description thereof with reference to the accompanying drawings, in which.

DETAILED DESCRIPTION OF THE EMBODIMENTS

Figure 1:
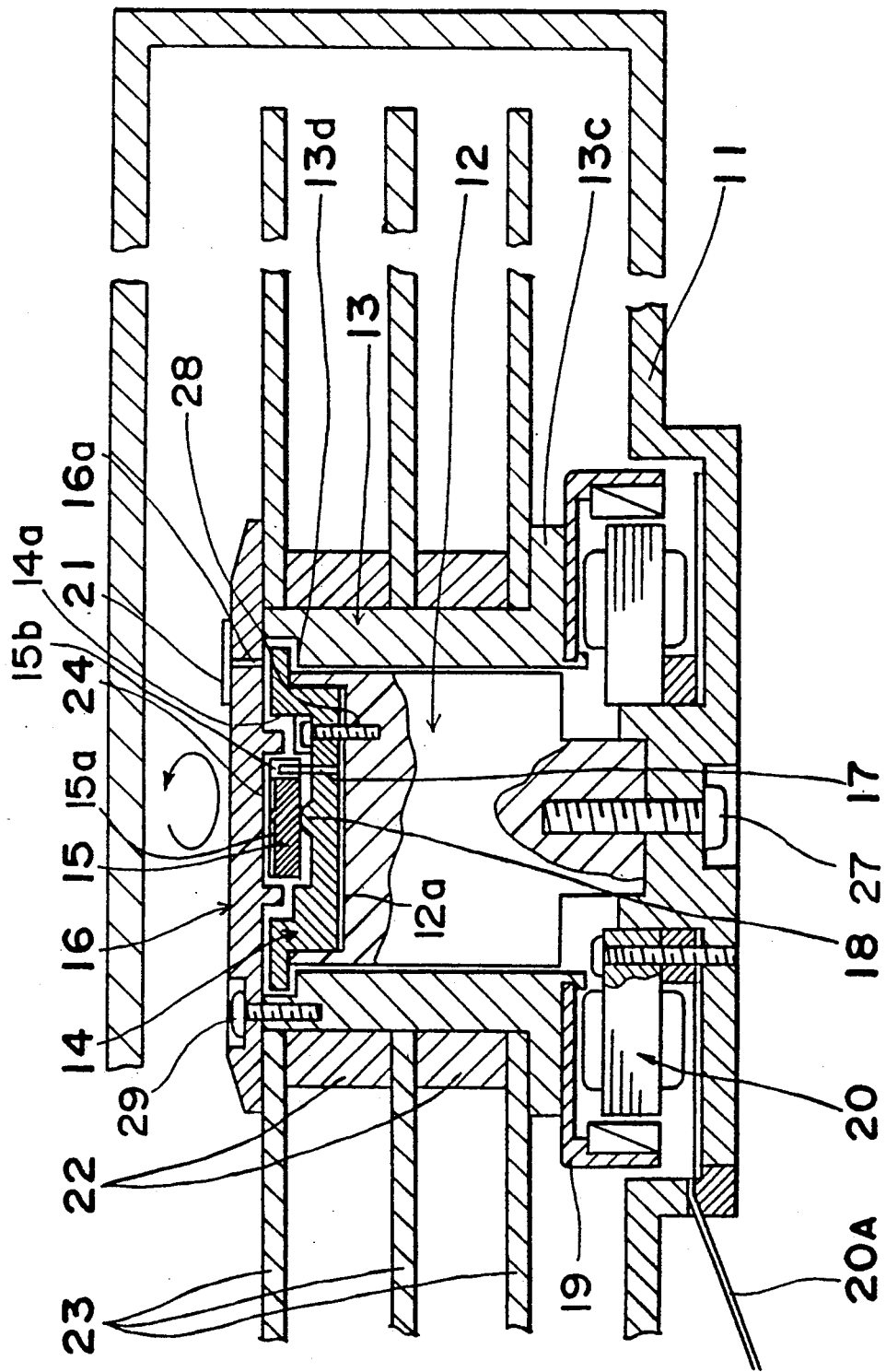
FIG. 1 is a longitudinal sectional view of a gas bearing device of a disk driving apparatus according to one embodiment of the present invention.

Before the description of the present invention proceeds, it is to be noted that like parts are designated by like reference numerals throughout the accompanying drawings.

A hydrodynamic gas bearing device of a disk driving apparatus according to one embodiment of the present invention will be described hereinbelow, referring to FIGS. 1-5.

Figure 1A:
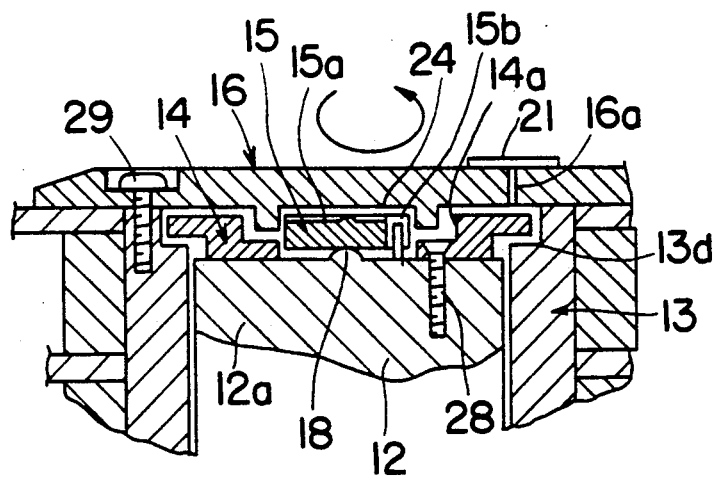
FIG. 1a shows a slightly modified part of the embodiment of FIG. 1.
Figure 2:
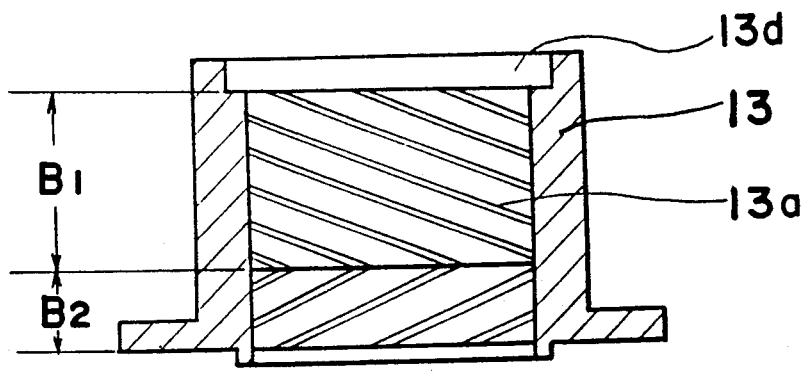
FIG. 2 is a longitudinal sectional view of a hub having a pattern of a hydrodynamic pressure generating groove shown in FIG. 1.
Figure 3:
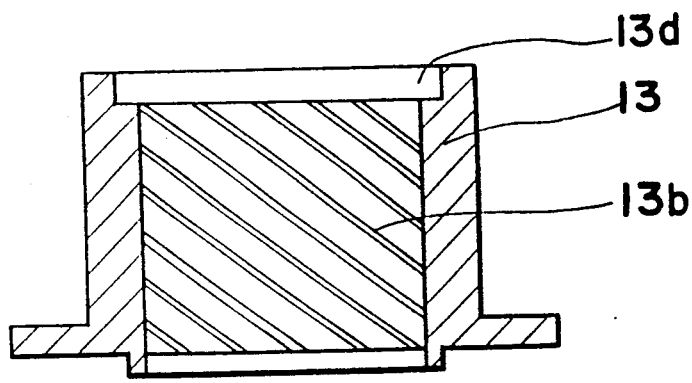
FIG. 3 is a longitudinal sectional view of a hub having another pattern of the hydrodynamic pressure generating groove shown in FIG. 1.
Figure 4:
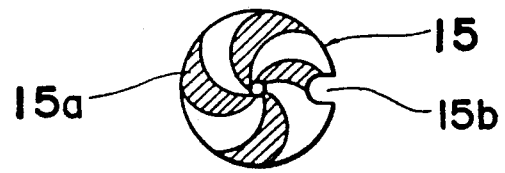
FIG. 4 is a plan view of a thrust bearing shown in FIG. 1.

In FIG. 1, reference numeral 11 denotes a chassis, and 12 denotes a fixed shaft fixed to the chassis 11 by a bolt 27. Reference numeral 13 denotes an approximately cylindrical hub rotatably mounted around the outer circumferential surface of the fixed shaft 12 and having a flange section 13c at the lower end thereof and a recess 13d at the upper end thereof. A stopper 14 is fixed in a recess 12a in the upper end of the fixed shaft 12 by a bolt 28. The stopper 14 extends radially into the recess 13d of the hub 13 to prevent a rotary member from slipping off the hub 13. The stopper 14 has a recess 14a at the upper end thereof. In a recess 14a of the stopper 14 is mounted a thrust bearing element 15 having a spiral groove 15a in the upper surface thereof and supported on a projection 18 formed at the middle of the bottom of the recess 14a so as to be capable of moving around the projection 18. While the projection 18 is shown as being on the stopper 14, it will be understood that it can be directly on the upper end of shaft 12 with the stopper therearound as shown in FIG. 1a. The gas bearing device in FIG. 1 is constituted by the upper surface of the thrust bearing element 15 movably arranged in the recess 14a of the stopper 14 and the lower surface of a disk fixing plate 16. The disk fixing plate 16 is fixed to the upper end of the hub 13 by a bolt 29 to cover the stopper 14 and the thrust bearing 15. The diameter of the disk fixing plate 16 is larger than that of the hub 13, so that disks 23 and spacers 22 alternately attached to the outer circumferential surface of the hub 13 and are fixed by the disk fixing plate 16 held against the flange section 13c under pressure. A rotation-preventing pin 17 fixed to the stopper 14 extends into a notch 15b of the thrust bearing element 15 to prevent the thrust bearing element 15 from rotating. A hydrodynamic pressure generating groove 15a of the thrust bearing element 15 holds lubricant 24 such as oil, grease, or gas. In either the inner circumferential surface of the hub 13 or the outer circumferential surface of the fixed shaft 12, a groove 13a in herringbone patterns or a groove 13b in a helical pattern is formed. FIG. 2 shows a longitudinal sectional view showing a case where the herringbone groove 13a is formed in the inner circumferential surface of the hub 13. The length $B_1$ of the upper part of the herringbone groove 13a is longer than the length $B_2$ of the lower thereof in FIG. 2. FIG. 3 shows a longitudinal sectional view showing a case where a helical groove 13b is formed in the inner circumferential surface of the hub 13. The helical groove 13b is for carrying gas downwardly in FIG. 3. The disk fixing plate 16 has an air intake 16a for passing gas therethrough and a filter 21 for filtering the gas, as shown in FIG. 1. The disk fixing plate 16 has the function of fixing the disks 23 and serving, together with thrust bearing elements, as part of a thrust bearing. Reference numeral 19 denotes a motor rotor fixed to the hub 13 by riveting. Reference numeral 20 denotes a motor stator fixed to the chassis 11 and supplied with electric power from leads 20A. Material comprising ester oil or olefin oil as the main component can be used as a lubricant for space 24. Although the fixed shaft 12 is fixed to the chassis 11 by the bolt 27, the chassis 11 can serve as a casing (not shown) for covering the disks 23.

The operation of the disk driving apparatus with the above-described construction will be described, referring to FIGS. 1-5.

In FIG. 1, when the stator 20 is energized, the rotor 19 starts to rotate together with the sleeve 13, the disks 23, the spacers 22, the disk fixing plate 16, and the thrust bearing element 15. At this time, the hydrodynamic pressure generating groove 13a or 13b of the radial bearing causes gas to generate pressure so as to carry out noncontacting rotation. The hydrodynamic pressure generating groove 15a of the thrust bearing causes the lubricant 24 such as oil or grease to generate some pump pressure so as to carry out noncontacting rotation. The hydrodynamic pressure generating groove 13a or 13b of the radial bearing produces a pressure increase during the rotation in FIG. 1, resulting in carrying the gas downwardly. The gas is cleaned through the filter 21 and supplied from the air intake 16a into the inside of the gas bearing device, resulting in prevention of seizing of the gas bearing device due to dust entering the gap of each bearing.

According to the embodiment of the present invention, the disk fixing plate 16 has the function of fixing the disks 23 and serving as part of the thrust bearing, resulting in a reduced number of parts of the gas bearing device. The thrust bearing element 15 is arranged to be capable of moving on the projection 18, with the result that it is unnecessary for the fixed shaft 12 to be exactly at a right angle to plate 16 and it is easy to manufacture the fixed shaft 12. The fixed shaft 12 has a sufficient diameter to be easily fixed to the chassis 11. After the gas is cleaned through the filter 21, the gas is supplied from the air intake 16a into the inside of the gas bearing device, resulting in prevention of seizing of the gas bearing device because of dust entering into a gap in each bearing.

Figure 5:
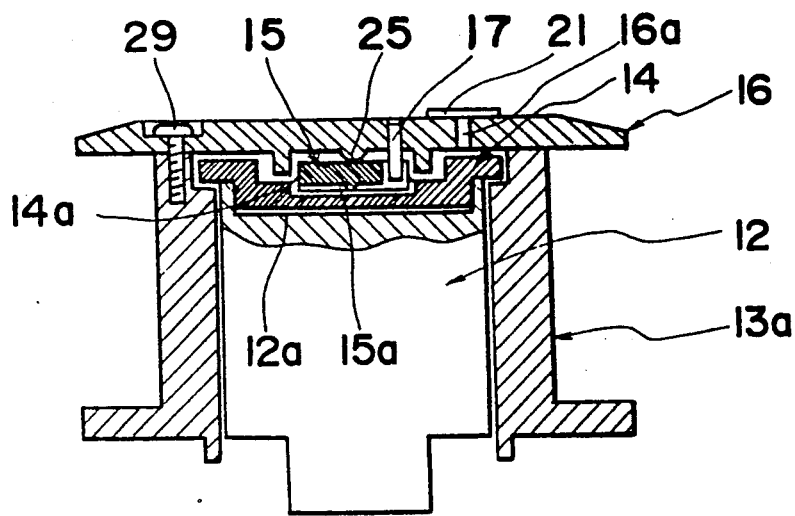
FIG. 5 is a plan view of another thrust bearing.
Figure 6:
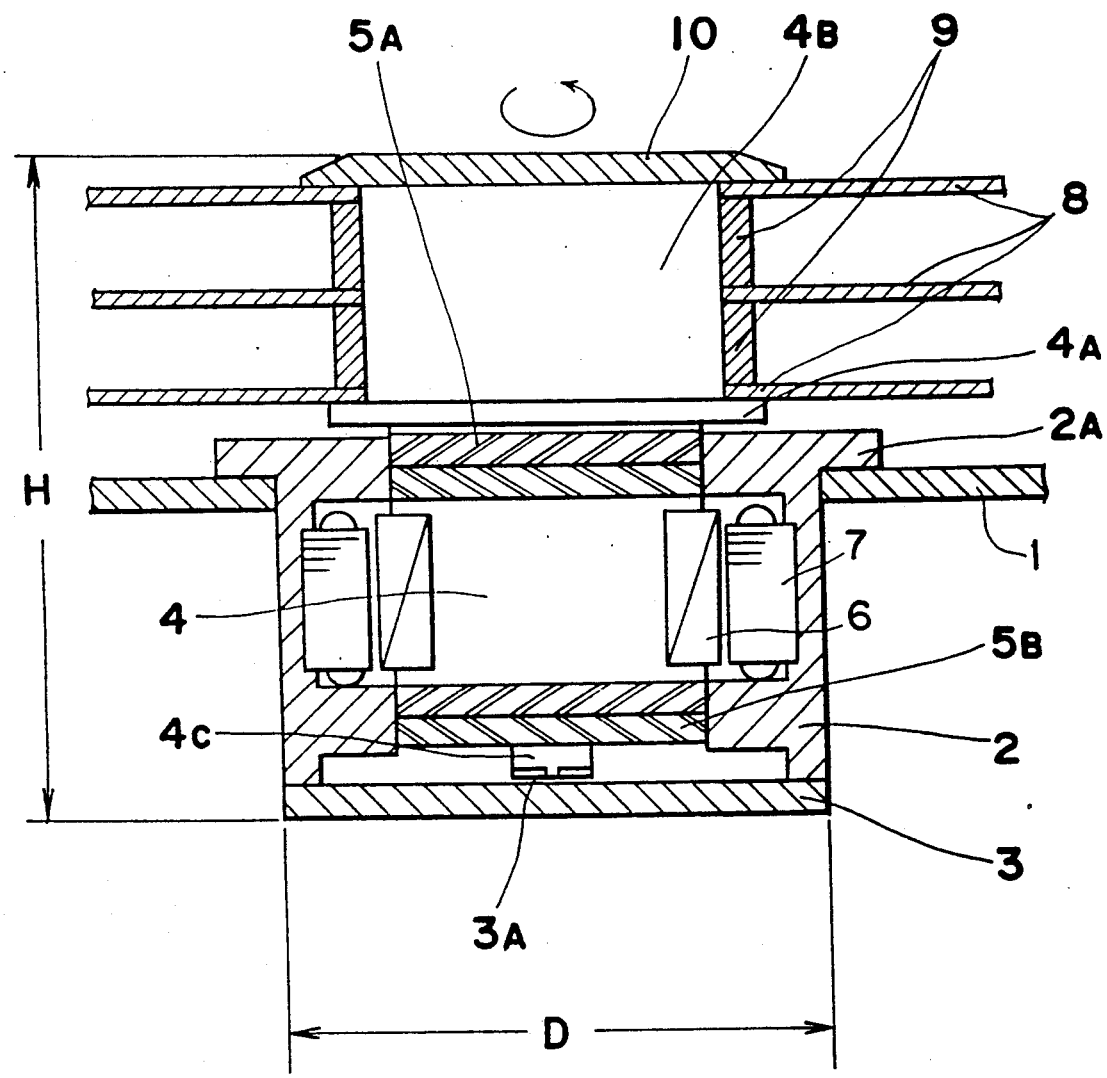
FIG. 6 is a longitudinal sectional view of a conventional gas bearing device.

FIG. 5 shows a hydrodynamic gas bearing device of a disk driving apparatus according to another embodiment of the present invention. The thrust bearing element 15 having a spiral groove 15a in the lower surface thereof is arranged between the bottom surface of the recess 14a of the stopper 14 and the lower surface of the disk fixing plate 16. A projection 25 in contact with the upper surface of the thrust bearing element 15 is formed at the middle of the lower surface of the disk fixing plate 16, so that the thrust bearing element 15 is capable of moving around the projection 25. The gas bearing device is constituted by the lower surface of the thrust bearing element 15 movably arranged between projection 25 and the bottom surface of the recess 14a of the stopper 14. The groove 15a of the thrust bearing element 15 holds the lubricant 24. This embodiment also can achieve the advantages described previously.

Although the present invention has been fully described in terms of the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A disk driving apparatus comprising:
    a chassis;
    a fixed shaft having one end attached to said chassis;
    a hub rotatably mounted around an outer circumferential surface of said fixed shaft and at least one disk mounted on an outer circumferential surface of said hub;
    the other end of said fixed shaft having a stopper means thereon for engaging said hub for retaining said hub on said fixed shaft;
    a disk fixing plate positioned over the other end of said fixed shaft and fixing said at least one disk to said hub and having a surface opposed to said other end of said fixed shaft;
    a thrust bearing element movably mounted between said disk fixing plate surface and one of said other end of said fixed shaft and said stopper means; and
    a hydrodynamic pressure generating groove formed in one of a herringbone pattern and a helical pattern and being on one of an outer circumferential surface of said fixed shaft and an inner circumferential surface of said hub.

2. A disk driving apparatus as claimed in claim 1 wherein said disk fixing plate has an air intake therein and a filter thereon for covering said air intake, whereby when said hub rotates on said fixed shaft, said groove causes gas to be carried from the stopper means toward the one end of said fixed shaft under pressure.

3. A disk driving apparatus as claimed in claim 1 wherein the chassis covers said at least one disk and said disk driving apparatus.

4. A disk driving apparatus as claimed in claim 1 further comprising a projection one one of said surface of said disk fixing plate and one of said other end of said fixed shaft and said stopper means. said thrust bearing having a thrust bearing surface opposed to and in thrust bearing relationship with one of said surface on said disk fixing plate and one of the other end of said fixed shaft and said stopper means, and having a further surface engaged with said projection for being movably arranged around said projection.

* * * * *